(12) United States Patent
Noda et al.

(10) Patent No.: US 11,196,459 B2
(45) Date of Patent: Dec. 7, 2021

(54) RECEPTION DEVICE, RECEPTION SIGNAL PROCESSING METHOD, CONTROL CIRCUIT, AND RECORDING MEDIUM

(71) Applicant: Mitsubishi Electric Corporation, Tokyo (JP)

(72) Inventors: Yasunori Noda, Tokyo (JP); Shunsuke Uehashi, Tokyo (JP); Katsuyuki Motoyoshi, Tokyo (JP); Shigeru Uchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/964,443

(22) PCT Filed: Nov. 2, 2018

(86) PCT No.: PCT/JP2018/040872
§ 371 (c)(1),
(2) Date: Jul. 23, 2020

(87) PCT Pub. No.: WO2019/171655
PCT Pub. Date: Sep. 12, 2019

(65) Prior Publication Data
US 2021/0050883 A1 Feb. 18, 2021

(30) Foreign Application Priority Data

Mar. 8, 2018 (WO) .................. PCT/JP2018/009062

(51) Int. Cl.
*H04B 7/005* (2006.01)
*H04B 1/76* (2006.01)
(Continued)

(52) U.S. Cl.
CPC ............... *H04B 7/005* (2013.01); *H04B 1/76* (2013.01); *H04L 25/022* (2013.01);
(Continued)

(58) Field of Classification Search
CPC ......... H04B 7/005; H04B 1/76; H04L 25/022; H04L 25/03057; H04L 27/2657;
(Continued)

(56) References Cited

U.S. PATENT DOCUMENTS 5,787,118 A * 7/1998 Ueda ...................... H04B 7/082
375/232
7,142,616 B2 11/2006 Ouchi et al.
(Continued)

FOREIGN PATENT DOCUMENTS

JP 2003-258685 A 9/2003

OTHER PUBLICATIONS

Ng et al., "Joint Structured Channel and Data Estimation over Time-Varying Channels", Proc. IEEE Globecom, 1997, pp. 409-413.

*Primary Examiner* — Dac V Ha
(74) *Attorney, Agent, or Firm* — Birch, Stewart, Kolasch & Birch, LLP

(57) ABSTRACT

A reception device includes an equalization processing unit including a linear filter unit and a nonlinear filter unit and performing equalization process on a reception signal; a linear propagation channel estimation unit making propagation channel estimation using a known signal included in a reception signal to calculate a filter coefficient of the linear filter unit; and a synchronization processing unit performing synchronization process of correcting frequency deviation based on a signal output by the equalization processing unit, and when a predetermined condition is satisfied after executing first equalization process of outputting a reception signal filtered by the linear filter unit to the synchronization processing unit, the equalization processing unit starts second equalization process that is an adaptive equalization process of outputting a result of addition of a reception signal filtered
(Continued)

by the linear filter unit and a reception signal filtered by the nonlinear filter unit to the synchronization processing unit.

23 Claims, 9 Drawing Sheets

(51) Int. Cl.
*H04L 25/02* (2006.01)
*H04L 25/03* (2006.01)
*H04L 27/26* (2006.01)

(52) U.S. Cl.
CPC .... *H04L 25/03057* (2013.01); *H04L 27/2657* (2013.01); *H04L 27/2675* (2013.01)

(58) Field of Classification Search
CPC ....... H04L 27/2675; H04L 2025/03477; H04L 2025/03668; H04L 25/03038
See application file for complete search history.

(56) References Cited

U.S. PATENT DOCUMENTS

| | | | |
|---|---|---|---|
| 2002/0196844 A1* | 12/2002 | Rafie | H04L 25/03038 375/232 |
| 2011/0069749 A1* | 3/2011 | Forrester | H04L 25/03038 375/232 |
| 2013/0148712 A1* | 6/2013 | Malipatil | H04L 25/03885 375/233 |
| 2017/0134190 A1* | 5/2017 | Hoshyar | H04L 7/0087 |

* cited by examiner

RECEPTION DEVICE, RECEPTION SIGNAL PROCESSING METHOD, CONTROL CIRCUIT, AND RECORDING MEDIUM

FIELD

The present invention relates to a reception device, a reception signal processing method, a control circuit, and a recording medium for performing a nonlinear equalization process.

BACKGROUND

A signal received by a reception device in a wireless communication system may be distorted due to inter-symbol interference or the like. As a main cause of the distortion, inter-symbol interference due to multipath in a propagation channel is exemplified. In addition, in a system of satellite communication or the like which performs single-carrier transmission over a wide band, group delay and amplitude characteristics of devices such as bandpass filters cannot be regarded as uniform in a frequency axis direction, and inter-symbol interference similar to that due to multipath may be caused. Furthermore, in some wireless communication systems, a signal is often amplified with power including a nonlinear region of an amplifier in order to improve power efficiency, and nonlinear distortion may occur.

Patent Literature 1 discloses an adaptive nonlinear equalizer using a Volterra filter. According to the adaptive nonlinear equalizer, both linear distortion and nonlinear distortion can be compensated for. In an equalizer using a filter, it is necessary to make a propagation channel estimation using a known signal to calculate filter coefficients. The number of filter coefficients corresponds to the tap length of the filter.

CITATION LIST

Patent Literature

Patent Literature 1: Japanese Patent Application Laid-open No. 2003-258685

SUMMARY

Technical Problem

However, according to the conventional technique disclosed in Patent Literature 1, if the number of filter coefficients to be calculated is larger than the number of symbols of a known signal, the filter coefficients cannot be obtained, which is a problem.

The present invention has been made in view of the above, and an object thereof is to provide a reception device capable of obtaining filter coefficients using a known signal including symbols the number of which is smaller than the number of filter coefficients to be calculated.

Solution to Problem

In order to solve the above problems and achieve the object, a reception device according to an aspect of the present invention includes: an equalization processing unit to perform an equalization process on a reception signal, the equalization processing unit including a linear filter unit and a nonlinear filter unit; a linear propagation channel estimation unit to make a propagation channel estimation using a known signal included in a reception signal to calculate a filter coefficient of the linear filter unit; and a synchronization processing unit to perform a synchronization process of correcting frequency deviation on a basis of a signal output by the equalization processing unit, wherein when a predetermined condition is satisfied after executing a first equalization process of outputting a reception signal filtered by the linear filter unit to the synchronization processing unit, the equalization processing unit starts a second equalization process that is an adaptive equalization process of outputting a result of addition of a reception signal filtered by the linear filter unit and a reception signal filtered by the nonlinear filter unit to the synchronization processing unit.

Advantageous Effects of Invention

The reception device according to the present invention achieves an effect that filter coefficients can be obtained by using a known signal including symbols the number of which is smaller than the number of filter coefficients to be calculated.

DESCRIPTION OF EMBODIMENTS

Hereinafter, a reception device a reception signal processing method, a control circuit, and a recording medium according to embodiments of the present invention will be described in detail with reference to the drawings. The present invention is not limited to the embodiments.

First Embodiment

Figure 1:
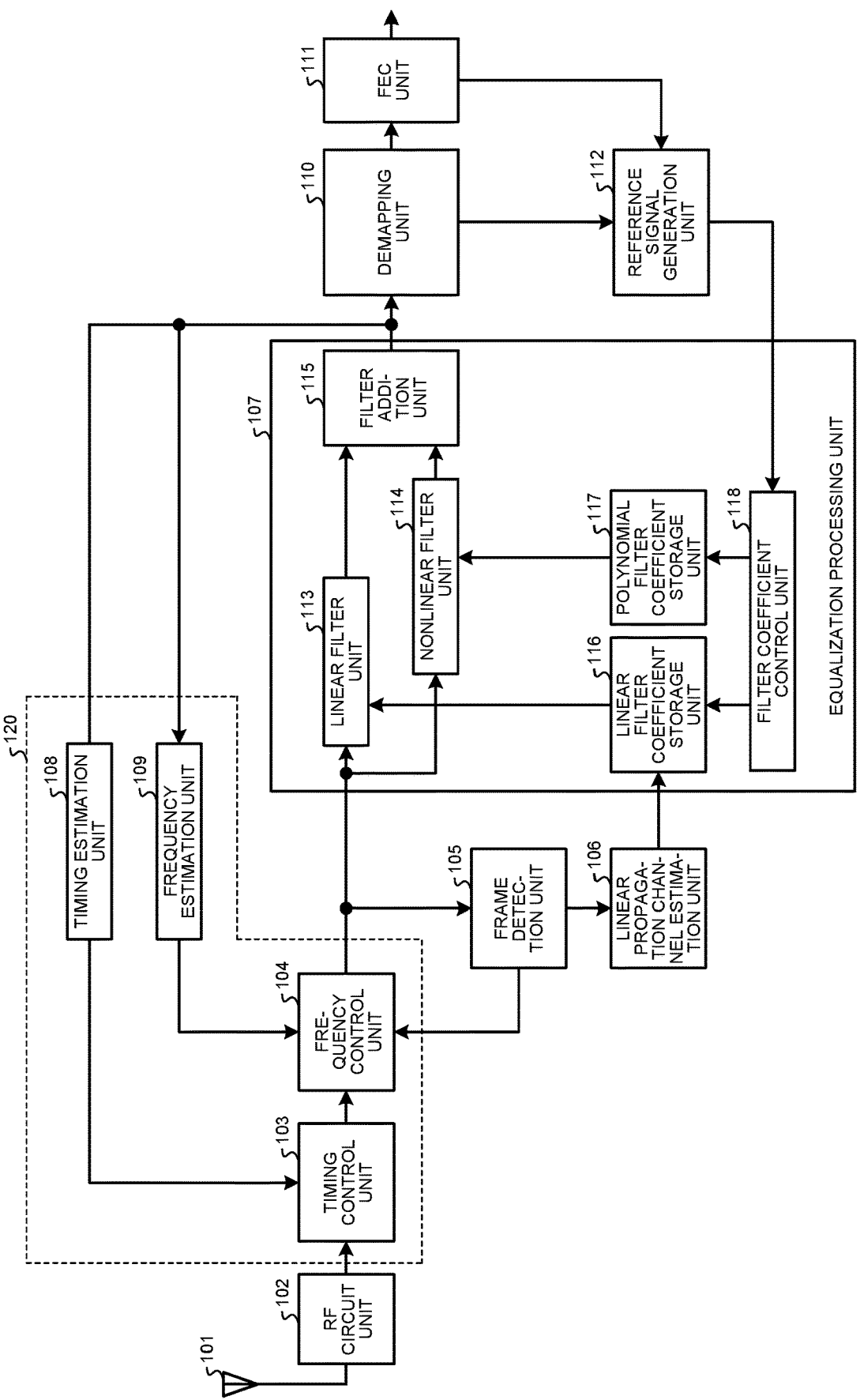
FIG. 1 is a diagram illustrating a functional configuration of a reception device according to a first embodiment of the present invention.

FIG. 1 is a diagram illustrating a functional configuration of a reception device 100 according to a first embodiment of the present invention. The reception device 100 includes a receiving antenna 101, a radio frequency (RF) circuit unit 102, a timing control unit 103, a frequency control unit 104, a frame detection unit 105, a linear propagation channel estimation unit 106, an equalization processing unit 107, a timing estimation unit 108, a frequency estimation unit 109, a demapping unit 110, a forward error correction (FEC) unit 111, and a reference signal generation unit 112.

The equalization processing unit 107 includes a linear filter unit 113, a nonlinear filter unit 114, a filter addition unit 115, a linear filter coefficient storage unit 116, a polynomial filter coefficient storage unit 117, and a filter coefficient control unit 118. The timing control unit 103, the frequency control unit 104, the timing estimation unit 108, and the frequency estimation unit 109 constitute a synchronization processing unit 120.

The receiving antenna 101 receives a wireless signal from a transmission device (not illustrated) via a propagation channel. The receiving antenna 101 inputs a reception signal to the RF circuit unit 102. The RF circuit unit 102 down-converts the reception signal input from the receiving antenna 101 to a baseband signal. The RF circuit unit 102 may include an analog/digital (A/D) converter, and it generates a baseband signal on the basis of various frequency conversion techniques and inputs the generated baseband signal to the timing control unit 103.

The timing control unit 103 performs an interpolation process, a resampling process, and the like on sampling values, so that an output signal has a predetermined oversampling ratio, and controls at least one of the symbol timing and the sampling clock of the output signal. The timing control unit 103 can use timing phase information, symbol clock frequency control information, and the like generated by the timing estimation unit 108 described later. The timing control unit 103 inputs the output signal to the frequency control unit 104.

The frequency control unit 104 performs frequency correction on the basis of the result of a frequency deviation estimation input from the frequency estimation unit 109 described later. The frequency control unit 104 can also remove frequency deviation on the basis of the frequency estimation result input from the frame detection unit 105 described later. Depending on the magnitude of a frequency error included in the reception signal, the input of the frequency estimation result from the frame detection unit 105 can be omitted. The frequency control unit 104 inputs the reception signal after the frequency correction to the frame detection unit 105 and the linear filter unit 113 and the nonlinear filter unit 114 of the equalization processing unit 107.

Figure 2:
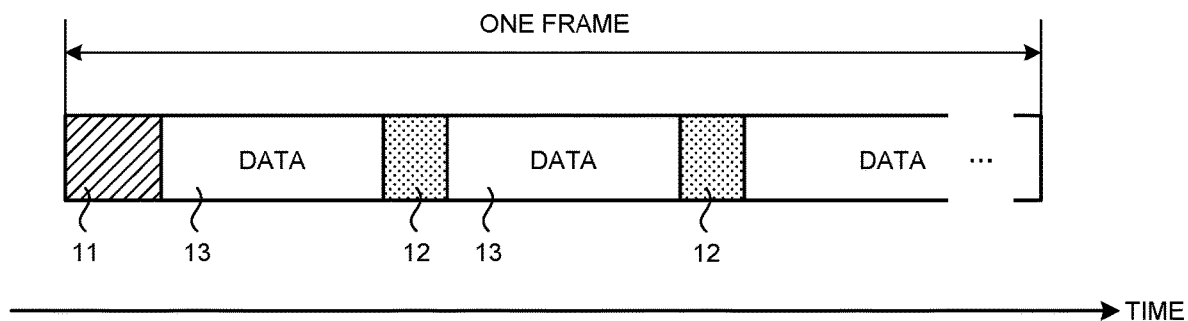
FIG. 2 is a diagram illustrating a frame configuration of a signal received by the reception device illustrated in FIG. 1.

The frame detection unit 105 performs a correlation process on the reception signal after the frequency correction with a known signal to extract a frame timing. FIG. 2 is a diagram illustrating a frame configuration of a signal received by the reception device 100 illustrated in FIG. 1. The signal received by the reception device 100 includes a header portion 11, pilot portions 12, and data portions 13 in one frame. The header portion 11 includes a known signal. This frame configuration is the same as a single carrier transmission format used in digital video broadcasting-satellite-second generation (DVB-S2) and DVB-S2X. The header portion 11 corresponds to a physical layer (PL) header, and the PL header includes start of frame (SOF) as a known signal.

The description returns to FIG. 1. The frame detection unit 105 detects the frame timing by correlating a reception signal with the SOF, and inputs a timing estimation result and a reception signal at a time point corresponding to the SOF to the linear propagation channel estimation unit 106. As described above, the frame detection unit 105 may estimate a frequency on the basis of the correlation process with the known signal, and may input a frequency estimation result to the frequency control unit 104. Note that the frame configuration illustrated in FIG. 2 is merely an example, and a single carrier transmission frame format including the known signal can be used. The arrangement of the known signal in the frame is not particularly limited.

The linear propagation channel estimation unit 106 makes a propagation channel estimation on the basis of the known signal included in the reception signal input from the frame detection unit 105, and estimates initial values of filter coefficients of the linear filter unit 113. The linear propagation channel estimation unit 106 inputs the calculated initial values of the filter coefficients to the linear filter coefficient storage unit 116 of the equalization processing unit 107.

Figure 3:
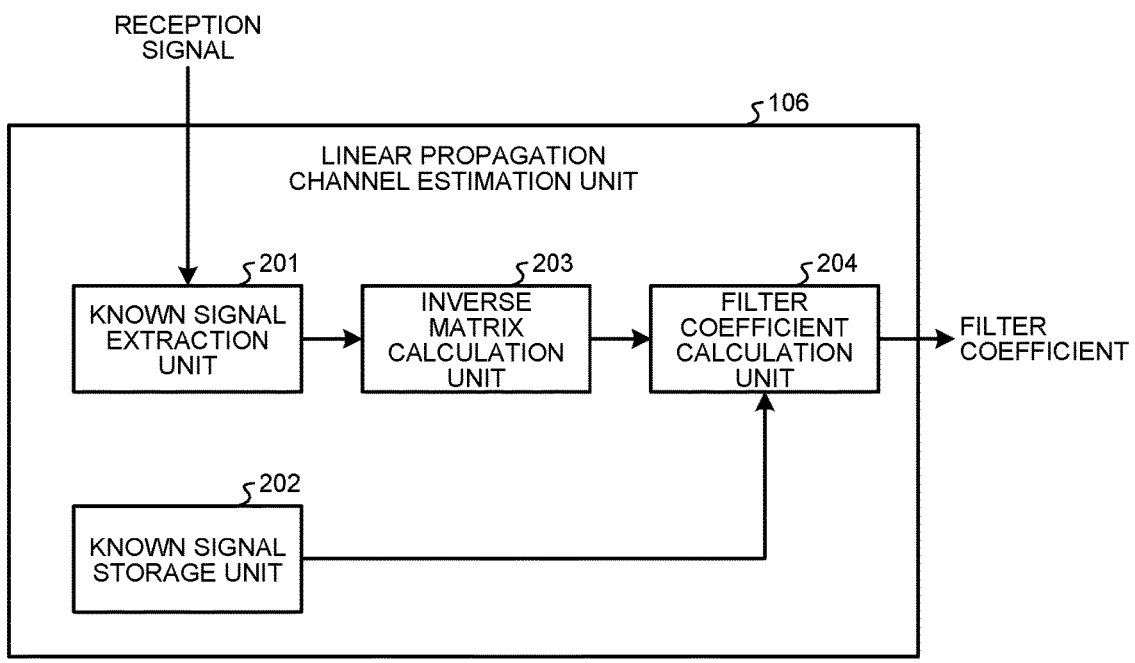
FIG. 3 is a diagram illustrating a detailed functional configuration of a linear propagation channel estimation unit illustrated in FIG. 1.

FIG. 3 is a diagram illustrating a detailed functional configuration of the linear propagation channel estimation unit 106 illustrated in FIG. 1. The linear propagation channel estimation unit 106 includes a known signal extraction unit 201, a known signal storage unit 202, an inverse matrix calculation unit 203, and a filter coefficient calculation unit 204.

The known signal extraction unit 201 extracts a known signal from the reception signal input from the frame detection unit 105. The known signal extracted by the known signal extraction unit 201 includes an influence of a distortion component of a propagation channel. The known signal extraction unit 201 inputs the extracted known signal to the inverse matrix calculation unit 203.

The inverse matrix calculation unit 203 generates an inverse matrix from the known signal input from the known signal extraction unit 201. The inverse matrix calculation unit 203 inputs the generated inverse matrix to the filter coefficient calculation unit 204. The known signal storage unit 202 includes an ideal known signal stored therein which contains no influence of the distortion component, and inputs the known signal to the filter coefficient calculation unit 204.

The filter coefficient calculation unit 204 calculates filter coefficients on the basis of the inverse matrix input from the inverse matrix calculation unit 203 and the ideal known signal input from the known signal storage unit 202. The filter coefficients calculated by the filter coefficient calculation unit 204 are used as initial values of filter coefficients of the linear filter unit 113.

The description returns to FIG. 1. The equalization processing unit 107 performs an equalization process using the reception signal input from the frequency control unit 104 and the filter coefficients input from the linear propagation channel estimation unit 106, and inputs the reception signal after the equalization process to the timing estimation unit 108, the frequency estimation unit 109, and the demapping unit 110. The equalization processing unit 107 first performs a first equalization process of performing filtering by the linear filter unit 113 in which the initial values of the filter coefficients have been set, and thereafter, when a predetermined condition is satisfied, the equalization processing unit 107 performs a second equalization process which is an adaptive equalization process of performing filtering by the linear filter unit 113 and the nonlinear filter unit 114. In the first equalization process, the equalization processing unit 107 outputs the reception signal filtered by the linear filter unit 113 to the synchronization processing unit 120. In the second equalization process, the equalization processing unit 107 outputs a result of addition of the reception signal filtered by the linear filter unit 113 and the reception signal filtered by the nonlinear filter unit 114 to the synchronization processing unit 120.

The linear filter unit 113 is a finite impulse response (FIR) type digital filter which performs convolution. The nonlinear filter unit 114 is, for example, a filter component of a Volterra filter from which a linear component is excluded. In addition, the nonlinear filter unit 114 may be configured by a third-order component based on a memory polynomial. When an n-th reception signal sampling value is denoted by y(n), an output $pf_{out}(n)$ of a polynomial filter of a tap length l+1 is represented by the following formula (1).

$$pf_{out}(n)=w(0)|y(n)|^2y(n)+w(1)|y(n-1)|^2y(n-1)+\ldots+w(l)|y(n-l)|^2y(n-l) \quad (1)$$

Here, w(k) is a coefficient of a k-th polynomial filter. k is an integer from 0 to l. Each of the linear filter unit 113 and the nonlinear filter unit 114 shifts oversampled signals by the number of oversamples at a time into a shift register constituting the FIR filter, and thereby conversion into an output of 1× oversampling can be performed. In addition, it is also possible to output the oversampled signals in an oversampled state by shifting the oversampled signals into the shift register one sample at a time.

The linear filter unit 113 uses filter coefficients stored in the linear filter coefficient storage unit 116. The nonlinear filter unit 114 uses filter coefficients stored in the polynomial filter coefficient storage unit 117. Regarding the filter coefficients stored in the linear filter coefficient storage unit 116, the filter coefficients input by the linear propagation channel estimation unit 106 are used as initial values, and thereafter, the filter coefficients are updated by the filter coefficient control unit 118. Regarding the filter coefficients stored in the polynomial filter coefficient storage unit 117, for example, initial values are set to zero, and thereafter, the filter coefficients are updated by the filter coefficient control unit 118.

The filter addition unit 115 adds an output of the linear filter unit 113 and an output of the nonlinear filter unit 114 together to generate an equalization result. The filter addition unit 115 inputs the generated equalization result to each of the timing estimation unit 108, the frequency estimation unit 109, and the demapping unit 110.

The filter coefficient control unit 118 controls the filter coefficients of each of the linear filter unit 113 and the nonlinear filter unit 114. Specifically, during a time period from when the signal is first detected to when a predetermined condition is satisfied, the filter coefficient control unit 118 causes the equalization processing unit 107 to perform the first equalization process in which the filter coefficients calculated by the linear propagation channel estimation unit 106 are used as the filter coefficients of the linear filter unit 113 in a state where the linear filter unit 113 is used and the nonlinear filter unit 114 is not used. The first equalization process is an equalization process using fixed filter coefficients. By fixing the filter coefficients of the nonlinear filter unit 114 to zero, the filter coefficient control unit 118 can realize a state where the nonlinear filter unit 114 is not used. Alternatively, the state where the nonlinear filter unit 114 is not used may be realized by the filter addition unit 115 outputting only the output of the linear filter unit 113 as an equalization result without adding the output of the nonlinear filter unit 114.

When the predetermined condition is satisfied, the filter coefficient control unit 118 can start the second equalization process using both the linear filter unit 113 and the nonlinear filter unit 114. The second equalization process is an adaptive equalization process in which filter coefficients are controlled by an adaptive algorithm on the basis of a reference signal generated by the reference signal generation unit 112 described later. As the adaptive algorithm, least mean square (LMS) or the like can be applied.

The condition for starting the second equalization process may be based on at least one of, for example, the time elapsed since the synchronization processing unit 120 started a synchronization process, the number of processed samples after the start of the synchronization process, and the signal quality after the equalization process. The number of processed samples after the start of the synchronization process can be the number of samples processed by the timing estimation unit 108 or the frequency estimation unit 109 described later. When the number of processed samples exceeds a threshold, the filter coefficient control unit 118 can start the second equalization process. The signal quality after the equalization process can be expressed based on the amount of error between a reference value obtained from a result of hard decision performed by the demapping unit 110 on an output of the equalization processing unit 107 and the output of the equalization processing unit 107. In addition, the signal quality after the equalization process can be expressed based on whether an error is detected after the FEC unit 111 performs error correction using an error correction code. The second equalization process may be started when the amount of error is equal to or less than the threshold, or the second equalization process may be started when no error is detected.

The timing estimation unit 108 estimates a symbol timing phase shift, generates timing phase information indicating a result of the estimation, and inputs the generated timing phase information to the timing control unit 103. A phenomenon may occur in which while the equalization processing unit 107 fixes the filter coefficients, the symbol timing phase gradually shifts due to a sampling clock shift. The timing estimation unit 108 estimates a symbol timing phase shift using a multiplication tank method or the like, and the timing control unit 103 compensates for the timing phase shift by interpolation on the basis of the timing phase information generated by the timing estimation unit 108, and thereby it is possible to reduce occurrence of the symbol timing phase shift.

The frequency estimation unit 109 estimates frequency deviation on the basis of a reception signal input from the equalization processing unit 107, and inputs a result of the estimation to the frequency control unit 104. The frequency estimation unit 109 can estimate the frequency deviation, for example, by averaging phase rotation of the reception signal, or by observing the phase rotation by making use of an adaptive filter by one-tap LMS with the use of a reference signal obtained by performing a hard decision process once. In addition, when the reception signal includes the pilot portions 12 as illustrated in FIG. 2, the frequency estimation unit 109 may estimate the frequency deviation by observing phase variation between the pilot portions 12. Regarding the reception signal output by the equalization processing unit 107, if a fractionally spaced equalization method which handles an oversampled reception signal is used, ideally, a signal which is obtained by sampling a Nyquist point and for which symbol timing synchronization is achieved is output. However, in practice, phase rotation due to a nonlinear distortion component and a frequency error is added. For the nonlinear distortion component, a reception signal which can be demodulated with a bit error rate of about 1% is often obtained depending on a back-off value. In general, frequency deviation is observed in a reception signal as phase rotation in units smaller than several degrees per symbol, excluding fluctuations due to noise. Therefore, the frequency estimation unit 109 estimates the frequency deviation, and the frequency control unit 104 performs the frequency correction on the basis of the result of the estimation, and thereby an influence of the frequency deviation can be reduced.

The demapping unit 110 performs a soft decision process, a hard decision process, a deinterleave process, and the like necessary for the FEC unit 111 to perform error correction. Hereinafter, a description will be given assuming that the demapping unit 110 performs hard decision, but the demapping unit 110 may perform both the soft decision process and the hard decision process, or may perform one of the soft decision process and the hard decision process. For example, the demapping unit 110 outputs a result of the hard decision process to each of the FEC unit 111 and the reference signal generation unit 112.

The FEC unit 111 performs error correction using an error correction code on the basis of the result of the hard decision process input from the demapping unit 110, and outputs a result thereof as a decoding result. In addition, the FEC unit 111 can determine whether the signal has been correctly decoded using a checksum or the like, and can input, to the reference signal generation unit 112, a data sequence obtained by re-encoding the signal determined to have been correctly decoded.

The reference signal generation unit 112 generates a reference signal used by the equalization processing unit 107 for performing an adaptive equalization process, and inputs the generated reference signal to the filter coefficient control unit 118 of the equalization processing unit 107. The reference signal generation unit 112 performs mapping on the basis of at least one of the hard decision result input from the demapping unit 110 and the re-encoded data sequence input from the FEC unit 111, performs conversion into a reference signal, and inputs the reference signal to the filter coefficient control unit 118.

When the reference signal generation unit 112 generates a reference signal on the basis of the data sequence input from the FEC unit 111, a time taken for the FEC unit 111 to perform an error correction process is prolonged, and the amount of delay increases. Therefore, in a state where a processing delay cannot be allowed, the reference signal generation unit 112 can generate a reference signal on the basis of the hard decision result input from the demapping unit 110 without using the data sequence input from the FEC unit 111. In addition, in a section where there is data for which the FEC unit 111 has failed in error correction, the reference signal generation unit 112 may generate a reference signal on the basis of the hard decision result input from the demapping unit 110. In a section including a known signal such as a pilot or SOF, the reference signal generation unit 112 can also use the known signal as it is as a reference signal.

Figure 4:
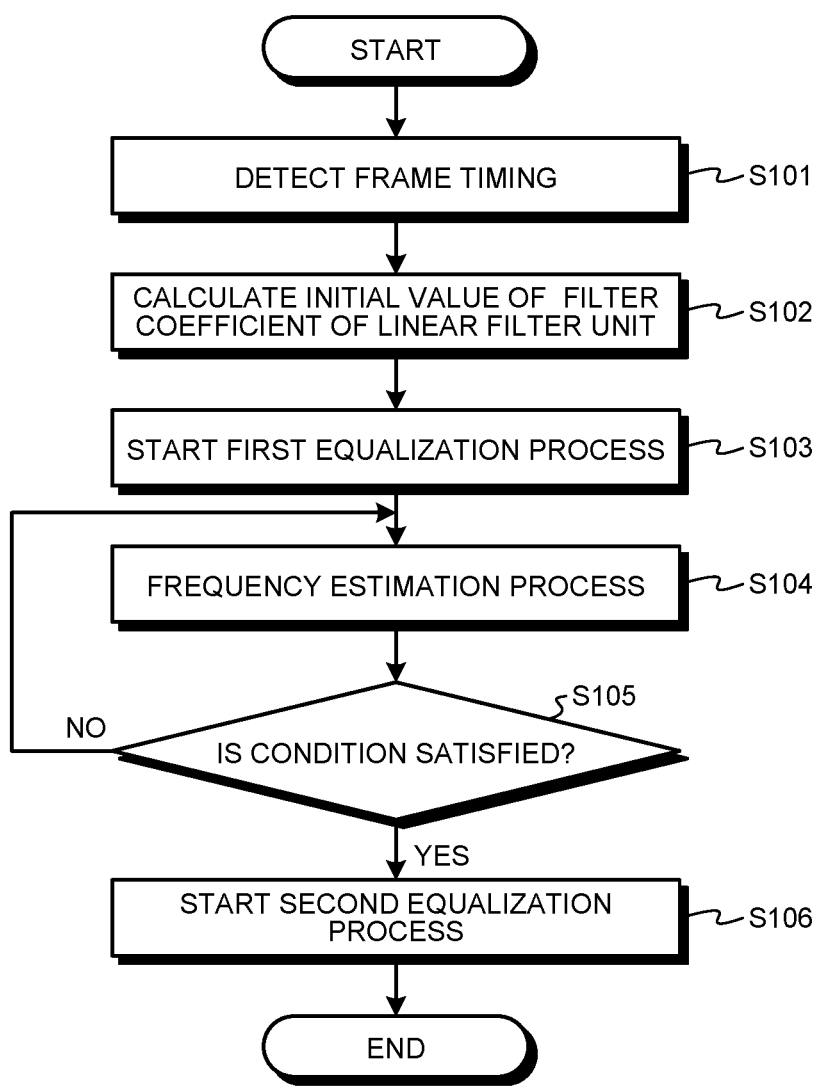
FIG. 4 is a flowchart illustrating an operation of the reception device illustrated in FIG. 1.

FIG. 4 is a flowchart illustrating an operation of the reception device 100 illustrated in FIG. 1. First, the frame detection unit 105 of the reception device 100 performs a frame timing detection process of detecting a part of a known signal (Step S101). The frame detection unit 105 extracts a reception signal corresponding to the known signal on the basis of the result of the detection, and inputs the reception signal to the linear propagation channel estimation unit 106. The linear propagation channel estimation unit 106 performs a propagation channel estimation process using the input reception signal, and calculates initial values of filter coefficients of the linear filter unit 113 (Step S102).

With the use of the calculated initial values, the equalization processing unit 107 starts the first equalization process performed in the state where the linear filter unit 113 is used and the nonlinear filter unit 114 is not used (Step S103). The signal after the equalization process output by the equalization processing unit 107 in the first equalization process is a signal sequence including sample data of the Nyquist point.

The frequency estimation unit 109 performs a frequency estimation process on a sample data sequence of the Nyquist point (Step S104). Specifically, the frequency estimation unit 109 performs a process of removing an influence of data bits for each modulation scheme, for example, a phase quadrupling process if the modulation scheme is quadrature phase shift keying (QPSK), and consequently, can estimate frequency deviation from phase variation or can estimate frequency deviation from the amount of phase variation between multiple known signals at different time points. Although not illustrated in FIG. 4, a timing estimation process by the timing estimation unit 108 or the like may be executed in parallel with the frequency estimation process.

The equalization processing unit 107 determines whether a predetermined condition is satisfied (Step S105). If the predetermined condition is satisfied (Step S105: Yes), the equalization processing unit 107 starts the second equalization process which is an adaptive equalization process using the linear filter unit 113 and the nonlinear filter unit 114 (Step S106). If the predetermined condition is not satisfied (Step S105: No), the frequency estimation process in Step S104 is repeated.

If the adaptive equalization process and the frequency estimation process are performed at the same time, especially when the number of taps is large and the number of filter coefficients to be controlled is large, there may occur a problem that the filter coefficients cannot correctly follow phase rotation due to frequency deviation. Therefore, in the above example, the frequency estimation process is first performed using fixed filter coefficients to increase the accuracy of the frequency estimation, and thereafter, update of the filter coefficients by an adaptive algorithm is started.

Figure 5:
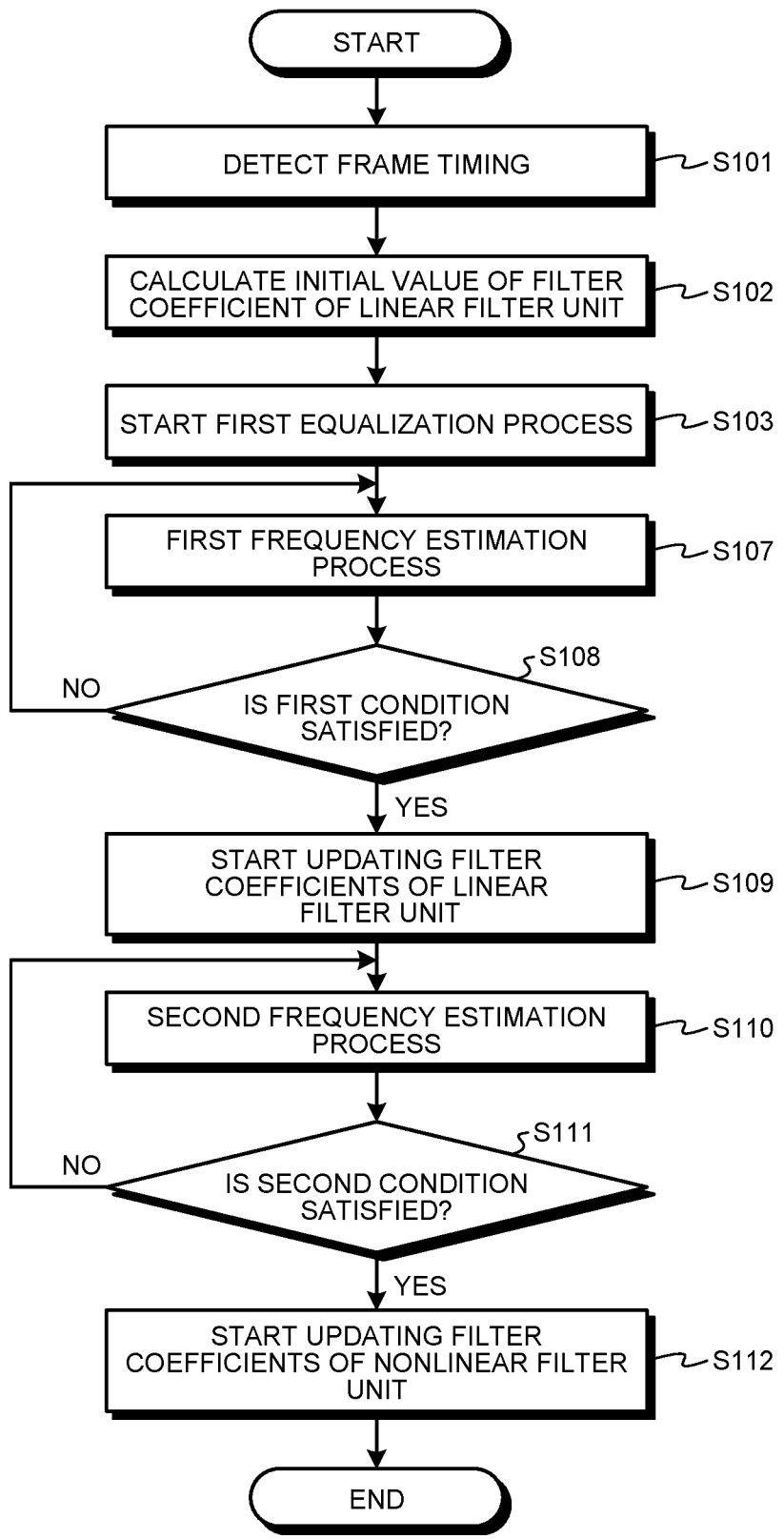
FIG. 5 is a flowchart illustrating a modification of the operation illustrated in FIG. 4.

FIG. 5 is a flowchart illustrating a modification of the operation illustrated in FIG. 4. When the number of taps of the filter is large, the reception device 100 is required to have high synchronization accuracy. Therefore, in this modification, after adaptive control of the filter coefficients of the linear filter unit 113 is started, the synchronization accuracy is further increased, and then adaptive control of the filter coefficients of the nonlinear filter unit 114 is started. The processes in Steps S101 to S103 illustrated in FIG. 5 are similar to those in FIG. 4.

The frequency estimation unit 109 performs a first frequency estimation process using fixed filter coefficients on the basis of a reception signal which has been equalized only with the linear filter unit 113 (Step S107). Then, the equalization processing unit 107 determines whether a predetermined first condition is satisfied (Step S108). If the first condition is satisfied (Step S108: Yes), the equalization processing unit 107 starts updating the filter coefficients of the linear filter unit 113 (Step S109). If the first condition is not satisfied (Step S108: No), the first frequency estimation process in Step S107 is repeated.

When the first condition is satisfied and the equalization processing unit 107 starts updating the filter coefficients of the linear filter unit 113, the frequency estimation unit 109 performs a second frequency estimation process (Step S110). Here, the second frequency estimation process uses a symbol data sequence longer than that used in the first frequency estimation process to improve the accuracy of the frequency estimation. Thereafter, the equalization processing unit 107 determines whether a second condition is satisfied (Step S111). If the second condition is satisfied (Step S111: Yes), the equalization processing unit 107 starts updating the filter coefficients of the nonlinear filter unit 114 (Step S112). If the second condition is not satisfied (Step S111: No), the second frequency estimation process in Step S110 is repeated.

By performing the operation illustrated in FIG. 5, the reception device 100 gradually increases the synchronization accuracy from a state where the synchronization is not perfect, and, while reducing adverse effects on a feedback process by the adaptive algorithm and an operation of the adaptive algorithm itself, finally realizes a highly accurate equalization process, which makes it possible to improve reception performance.

As described above, according to the reception device 100 of the first embodiment of the present invention, first, the first equalization process is performed using the initial values of the filter coefficients obtained by the propagation channel estimation using the known signal, in a state where the linear filter unit 113 is used and the nonlinear filter unit 114 is not used, for example, the filter coefficients of the nonlinear filter unit 114 are set to zero, and the synchronization process is performed using the reception signal after the first equalization process. Then, after increasing the synchronization accuracy, the second equalization process which is an adaptive equalization process is started. Therefore, even when the number of taps of the filter is large and the number of filter coefficients to be calculated is larger than the number of symbols of the known signal, the filter coefficients can be calculated.

In addition, the filter coefficient control unit 118 can individually control timing of starting the adaptive control of the filter coefficients of the linear filter unit 113 and timing of starting the adaptive control of the filter coefficients of the nonlinear filter unit 114. This makes it possible to reduce the adverse effects of the feedback process of the adaptive algorithm on the synchronization process and the operation of the adaptive algorithm itself.

Second Embodiment

Figure 6:
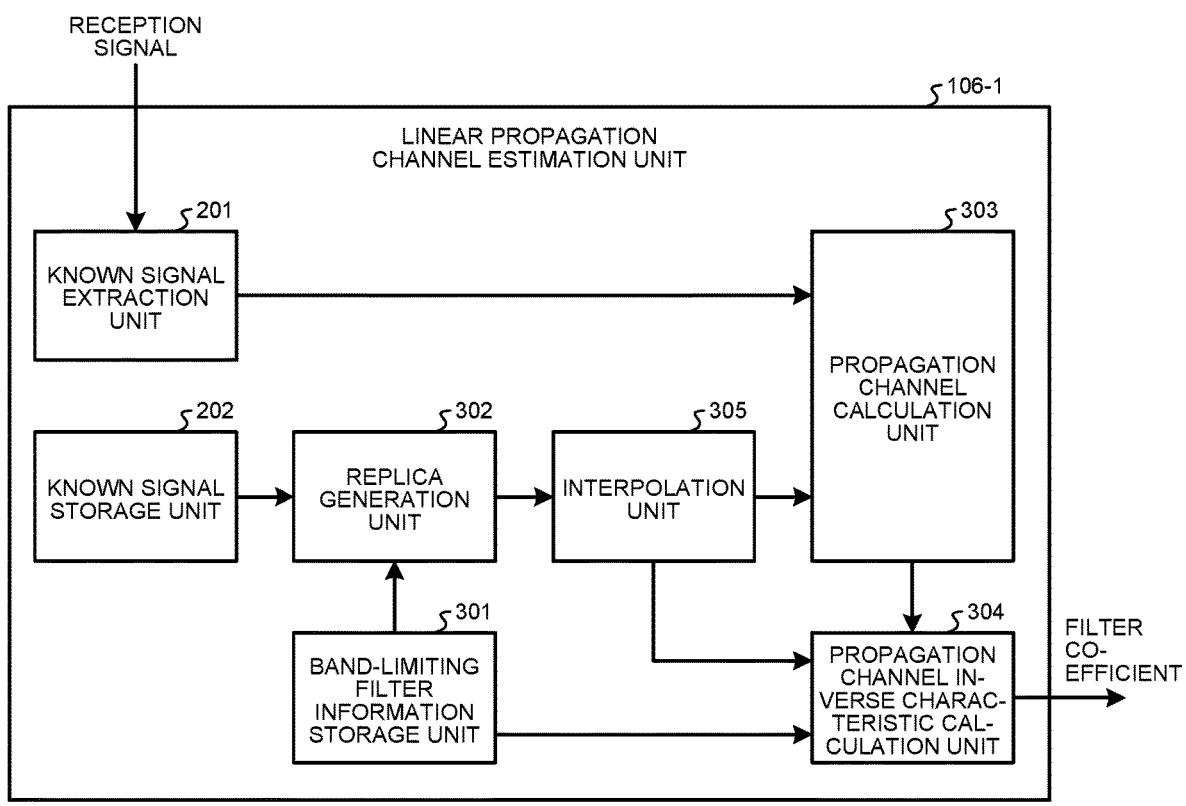
FIG. 6 is a diagram illustrating a configuration of a linear propagation channel estimation unit according to a second embodiment of the present invention.

FIG. 6 is a diagram illustrating a configuration of a linear propagation channel estimation unit 106-1 according to a second embodiment of the present invention. The reception device according to the second embodiment is obtained by replacing the linear propagation channel estimation unit 106 of the reception device 100 illustrated in FIG. 1 with the linear propagation channel estimation unit 106-1 illustrated in FIG. 6. Other configuration than the above is similar to that of the reception device 100, so that the description thereof will be omitted.

The linear propagation channel estimation unit 106-1 includes the known signal extraction unit 201, the known signal storage unit 202, a band-limiting filter information storage unit 301, a replica generation unit 302, a propagation channel calculation unit 303, a propagation channel inverse characteristic calculation unit 304, and an interpolation unit 305.

The functions of the known signal extraction unit 201 and the known signal storage unit 202 are similar to those in the first embodiment. The known signal extraction unit 201 inputs an extracted known signal to the propagation channel calculation unit 303. The known signal storage unit 202 outputs a known signal stored therein to the replica generation unit 302.

The band-limiting filter information storage unit 301 includes band-limiting filter information stored therein which is a coefficient of an FIR filter corresponding to a coefficient of a band-limiting roll-off filter on a transmission side. Alternatively, the band-limiting filter information storage unit 301 may include weight stored therein in which influences of the RF circuit unit 102 and a band-limiting filter on a reception side are convolved. The band-limiting filter information storage unit 301 can input the band-limiting filter information stored therein to the replica generation unit 302 and the propagation channel inverse characteristic calculation unit 304.

The replica generation unit 302 generates a replica, which is a reception signal sequence which has been waveform-shaped in an oversampled state, using the band-limiting filter information and a known signal input from the known signal storage unit 202. The replica generation unit 302 inputs the generated replica to the interpolation unit 305.

The interpolation unit 305 can input, to the propagation channel calculation unit 303, the replica input from the replica generation unit 302 while shifting a sampling timing thereof. The interpolation unit 305 can input multiple replicas generated with different timing offsets to the propagation channel calculation unit 303 and the propagation channel inverse characteristic calculation unit 304.

The propagation channel calculation unit 303 makes a propagation channel estimation on the basis of a replica generated by the replica generation unit 302 and a known signal extracted from a reception signal. Specifically, the propagation channel calculation unit 303 makes the propagation channel estimation by multiplying an inverse matrix of a matrix composed of replica components by a matrix composed of reception signal components. The propagation channel calculation unit 303 inputs a propagation channel estimation result to the propagation channel inverse characteristic calculation unit 304. At that time, it is possible for the propagation channel calculation unit 303 to generate multiple propagation channel estimation results using respective multiple replicas input from the interpolation unit 305, to select one of the multiple propagation channel estimation results, and to input the selected propagation channel estimation result to the propagation channel inverse characteristic calculation unit 304. For example, the propagation channel calculation unit 303 can select, from the multiple propagation channel estimation results, a candidate having the smallest sum of absolute values of filter coefficients.

The propagation channel inverse characteristic calculation unit 304 calculates a propagation channel estimation value in consideration of an influence of waveform shaping, which is a propagation channel inverse characteristic, on the basis of the band-limiting filter information input from the band-limiting filter information storage unit 301, the replica input from the interpolation unit 305, and the propagation channel estimation result input from the propagation channel calculation unit 303. The propagation channel inverse characteristic calculation unit 304 converts the calculated propagation channel estimation value into a filter coefficient of the linear filter unit 113 and outputs the filter coefficient.

Information on a band-limiting filter can be calculated in advance. Therefore, information on an inverse characteristic to be generated can be generated in advance as well. By reducing the amount of information on a component which varies depending on a propagation channel and calculating some inverse characteristics in advance, a calculation load of an inverse characteristic calculation can be reduced.

As described above, according to the linear propagation channel estimation unit 106-1 of the second embodiment of the present invention, instead of directly calculating an inverse characteristic of a propagation channel, the propagation channel is identified and then filter coefficients of the equalization processing unit 107 are generated as the inverse characteristic. Thus, the tap length of the propagation channel to be calculated can be reduced, which facilitates a configuration of an inverse matrix calculation process. In addition, according to the linear propagation channel estimation unit 106-1, on the basis of shape information on a band-limiting filter on the transmission side, propagation channel characteristics can be estimated excluding an influence of the band-limiting filter. With the above configuration, the number of variables to be estimated can be reduced even in a situation where the tap length of the filter of the equalization processing unit 107 tends to be long, such as when a roll-off rate is small, and the filter coefficients of the equalization processing unit 107 can be determined even if the number of symbols of the known signal is small.

In addition, according to the linear propagation channel estimation unit 106-1, the interpolation unit 305 generates multiple known signal sequences generated with multiple different timing offsets. Therefore, the replica generation unit 302 generates multiple replicas each based on one of the multiple known signal sequences. When there is a timing shift between the replicas generated by the replica generation unit 302 and a signal generated by the known signal extraction unit 201, among values of the propagation channel components, a value of a component excluding the influence of the band-limiting filter varies. As described above, with the propagation channel estimation made on the basis of each of the multiple known signal sequences generated with the multiple different timing offsets, it is possible to reduce an influence of the timing shift.

Third Embodiment

Figure 7:
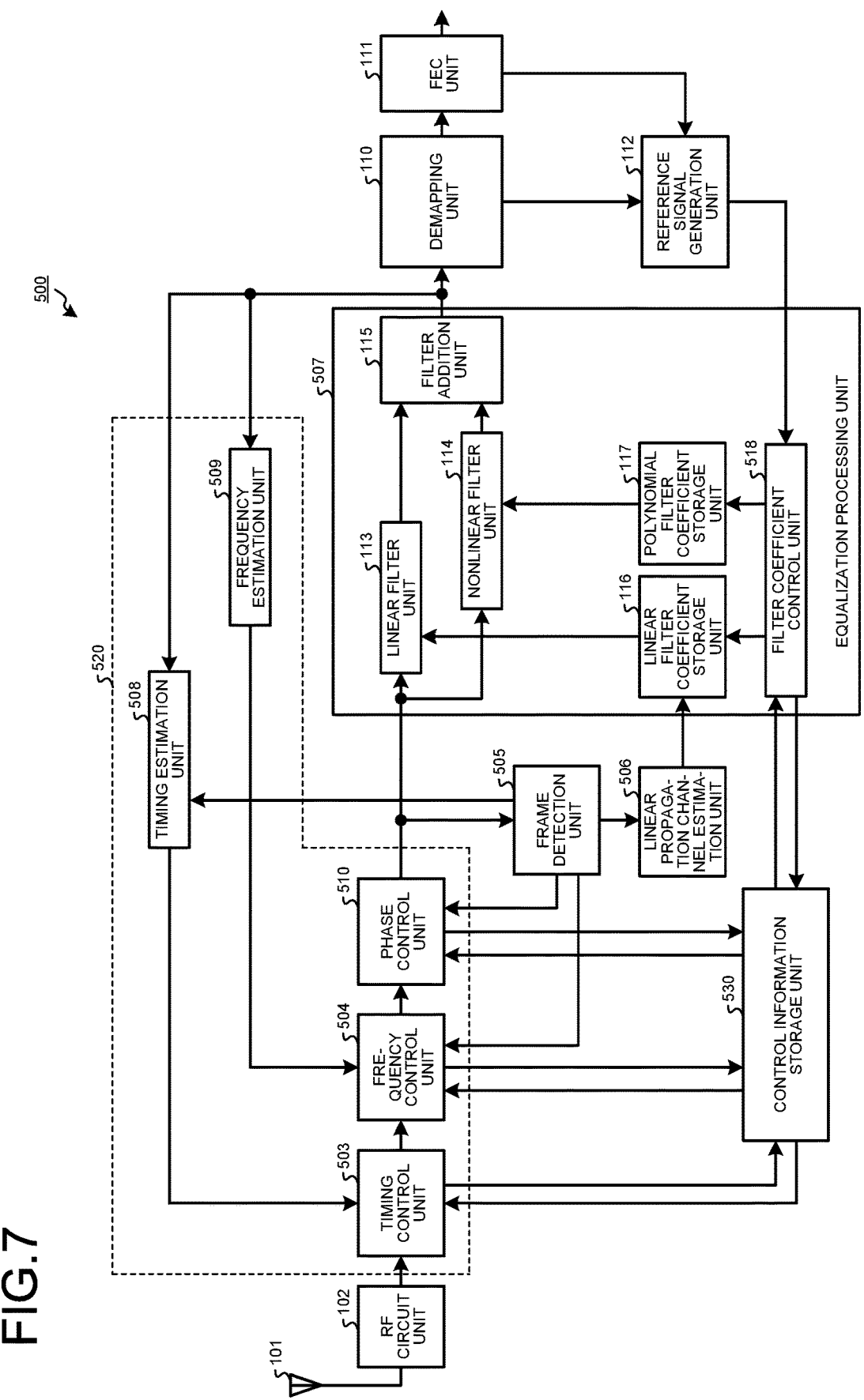
FIG. 7 is a diagram illustrating a functional configuration of a reception device according to a third embodiment of the present invention.

FIG. 7 is a diagram illustrating a functional configuration of a reception device 500 according to a third embodiment of the present invention. The reception device 500 according to the third embodiment is used in a system in which a burst signal arrives nonconsecutively in time. The system in which a burst signal arrives nonconsecutively in time is a system in which signals arrive at a predetermined interval from the same terminal using, for example, time division multiple access (TDMA) technology.

Figure 8:
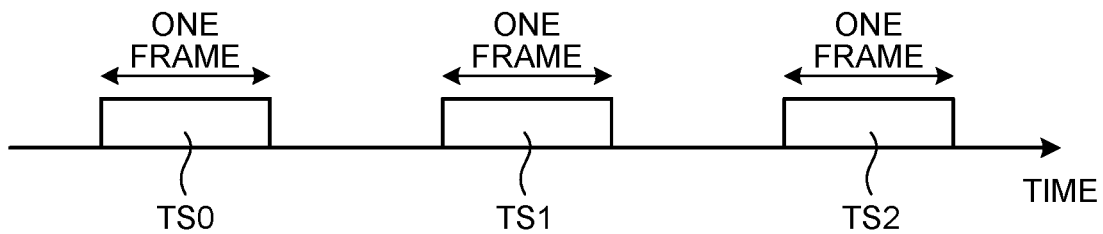
FIG. 8 is a diagram illustrating a configuration of a signal received by the reception device illustrated in FIG. 7.

FIG. 8 is a diagram illustrating a configuration of a signal received by the reception device 500 illustrated in FIG. 7. The signal received by the reception device 500 is time-divided by TDMA, and is a burst signal which arrives nonconsecutively on a frame basis. In time slots TS0, TS1, and TS2 illustrated in FIG. 8, the reception device 500 receives a signal. At a timing when a signal is received in the time slot TS1, if the time slot TS1 is referred to as a current time slot, the time slot TS0 can be referred to as a previous time slot because the time slot TS0 is a time slot in which the signal was received previous time. If the current time slot is the time slot TS1, the time slot TS2 can be referred to as a next time slot. Similarly, if the current time slot is the time slot TS2, the previous time slot is the time slot TS1. Hereinafter, the reception signal of the current time slot may be referred to as a current reception signal, and the reception signal of the previous time slot may be referred to as a past reception signal. Although FIG. 8 illustrates an example in which the signal arrives at the reception device 500 frame by frame with a fixed interval, multiple frames may arrive at the reception device 500 collectively, or an arrival interval may not necessarily be fixed.

The description returns to FIG. 7. The reception device 500 includes the receiving antenna 101, the RF circuit unit 102, a timing control unit 503, a frequency control unit 504, a frame detection unit 505, a linear propagation channel estimation unit 506, an equalization processing unit 507, a timing estimation unit 508, a frequency estimation unit 509, a phase control unit 510, a control information storage unit 530, the demapping unit 110, the FEC unit 111, and the reference signal generation unit 112. The timing control unit 503, the frequency control unit 504, the timing estimation unit 508, the frequency estimation unit 509, and the phase control unit 510 may be collectively referred to as a synchronization processing unit 520. The equalization processing unit 507 includes the linear filter unit 113, the nonlinear filter unit 114, the filter addition unit 115, the linear filter coefficient storage unit 116, the polynomial filter coefficient storage unit 117, and a filter coefficient control unit 518.

Among the components of the reception device 500, components having functions and operations similar to those of the components of the reception device 100 are given the same names and reference numerals as those in the first embodiment, and redundant descriptions thereof will be omitted. In addition, among the components of the reception device 500, components having functions similar to those of the components of the reception device 100 and having operations partially different from those of the components of the reception device 100 are given the same names as and different reference numerals from those in the first embodiment. Hereinafter, components different from those of the reception device 100 will be mainly described.

The control information storage unit 530 stores synchronization information indicating a synchronization state of a reception signal which has been subjected to a synchronization process by the synchronization processing unit 520 and is input to the equalization processing unit 507, and filter coefficients of the equalization processing unit 507. The synchronization information and the filter coefficients can also be collectively referred to as control information. The synchronization information includes timing information indicating a sampling timing of the reception signal after being corrected by the timing control unit 503 of the synchronization processing unit 520, and frequency information indicating a frequency control value used by the frequency control unit 504 of the synchronization processing unit 520 to correct the frequency of the reception signal. The synchronization information further includes a phase value of the reception signal input to the equalization processing unit 507. The filter coefficients include the filter coefficients of the linear filter unit 113 and the filter coefficients of the nonlinear filter unit 114.

The timing at which the control information storage unit 530 stores the control information may be a periodic timing, for example, once per frame, or a timing requested by the control information storage unit 530.

The synchronization processing unit 520 has a function of reading, from the control information storage unit 530, synchronization information stored when processing a past reception signal, and performing a synchronization process on a current reception signal using the past synchronization information. Specifically, the synchronization processing unit 520 obtains a difference between the past synchronization information thus read and the synchronization information on the current reception signal, and corrects the current reception signal on the basis of the obtained difference. More specifically, in addition to the function of the timing control unit 103, the timing control unit 503 obtains a difference between pieces of the timing information included in the synchronization information, and corrects the sampling timing of the current reception signal so as to interpolate the difference. The phase control unit 510 obtains a difference between pieces of the phase information included in the synchronization information, and corrects a phase of the current reception signal so as to interpolate the difference. In addition to the function of frequency control unit 104, the frequency control unit 504 can correct the frequency of the current reception signal using a frequency control value indicated by the frequency information included in the past synchronization information. As described above, the reuse of the past frequency information eliminates need to make a frequency estimation. If the frequency variation is large compared to the time slot interval and it is difficult to reuse the frequency information, it is enough for frequency estimation to be made.

When the reception device 500 receives a burst signal such as that illustrated in FIG. 8, first, a baseband signal generated by the receiving antenna 101 and the RF circuit unit 102 is input to the timing control unit 503 of the synchronization processing unit 520. Hereinafter, a description will be given using an example in which the current time slot is the time slot TS1. When the reception signal of the time slot TS1 as the current time slot is input to the timing control unit 503, the timing control unit 503 retrieves, from the control information storage unit 530, past timing information from past control information, for example, control information on the time slot TS0 as the previous time slot, and obtains a difference between the sampling timings using current timing information and the past timing information. The timing control unit 503 corrects the sampling timing so as to interpolate the obtained difference. Such a function makes it possible to correct a sampling timing shift occurring between the previous time slot and the current time slot, and to perform an equalization process reusing the filter coefficients. Instead of correcting the sampling timing of the reception signal, the stored timing information may be corrected. In that case, the timing control unit 503 reads the past timing information from the control information storage unit 530, corrects the past timing information so as to interpolate the difference from the current timing information, and stores the corrected timing information in the control information storage unit 530 again. As a timing correction method, a resampling process using an interpolation filter which slightly changes a sampling point of a signal, or the like is exemplified, but any method may be used as long as a sampling timing can be corrected. The timing control unit 503 inputs the reception signal which has been subjected to the correction process to the frequency control unit 504.

The frequency control unit 504 can read past frequency information stored in the control information storage unit 530 and reuse a frequency control value indicated by the frequency information. In that case, the frequency estimation process can be omitted. When not reusing the frequency control value, it is enough for the frequency control unit 504 to perform the frequency estimation process.

The phase control unit 510 reads, from the control information storage unit 530, phase information indicating a phase value of a reception signal assumed by the filter coefficients in a past time slot, for example, the time slot TS0 as the previous time slot, and obtains a difference from a phase estimation value of a reception signal in the current time slot output by the frame detection unit 505 described later. The phase control unit 510 has a function of controlling a phase of the reception signal on the basis of the obtained difference. With the use of such a function, a phase of the reception signal after equalization when the equalization process is performed reusing the filter coefficients can be made to be as assumed. The phase control unit 510 may rotate phases of stored filter coefficients instead of correcting the phase of the reception signal. In that case, it is enough for the phase control unit 510 to read the phase information from the control information storage unit 530, to rotate a phase indicated by the read phase information, and to store phase information indicating the rotated phase in the control information storage unit 530 again. The phase control unit 510 inputs the reception signal whose phase has been controlled to the frame detection unit 505, the linear filter unit 113, and the nonlinear filter unit 114.

In addition to the function of the frame detection unit 105, the frame detection unit 505 has a function of estimating a phase value of a reception signal on the basis of a correlation value between the reception signal and SOF as a known signal. With the use of the function, a phase of the reception signal in the current time slot can be recognized, and the phase control unit 510 can correct the phase of the current reception signal. In addition, the frame detection unit 505 has a function of inputting, to the timing estimation unit 508, a reception signal at a time point corresponding to the SOF obtained when detecting a frame in order to estimate a sampling timing assumed by the filter coefficients used in the current time slot. A function of inputting a reception signal at a time point corresponding to the SOF to the linear propagation channel estimation unit 506 is performed only when the linear propagation channel estimation unit 506 operates.

The linear propagation channel estimation unit 506 has a function similar to that of the linear propagation channel estimation unit 106, but when filter coefficients in the previous time slot are stored in the control information storage unit 530 and the equalization process is performed reusing the stored filter coefficients, the linear propagation channel estimation unit 506 does not operate. In that case, the linear propagation channel estimation unit 506 does not output anything to the linear filter coefficient storage unit 116. When only the filter coefficients of the nonlinear filter unit 114 are reused, the linear propagation channel estimation unit 506 executes estimation of initial values of the filter coefficients of the linear filter unit 113 similarly to the linear propagation channel estimation unit 106.

The equalization processing unit 507 performs an equalization process, which is a filtering process using the linear filter unit 113 and the nonlinear filter unit 114, on the reception signal input from the phase control unit 510. At that time, the linear filter unit 113 uses filter coefficients input from the linear filter coefficient storage unit 116, and the nonlinear filter unit 114 uses filter coefficients input from the polynomial filter coefficient storage unit 117. When a tap coefficient of the previous time slot is reused, the second equalization process which is an adaptive equalization process can be executed from the first without separation into the first equalization process and the second equalization process as indicated in the first embodiment. Note that when the variation of the propagation channel is large, when the interval between TDMA time slots is wide, or the like, it is difficult to reuse the filter coefficients of the previous time slot. When it is difficult to reuse the filter coefficients, it is enough for the equalization processing unit 507 to execute the equalization processes in order starting from the first equalization process, similarly to the first and second embodiments. In addition, when it is not necessary to perform nonlinear equalization in the current time slot, for example, when the number of modulation levels is small, only linear equalization may be executed reusing only the linear filter coefficients of the previous time slot without using the nonlinear filter coefficients.

When estimation accuracy of the frame detection unit 505 and the timing estimation unit 508 is low, there is a case where a reference signal for LMS update can be generated, but an equalization output error is large and thereby demodulation performance for a beginning part of a reception signal is reduced. In that case, it is also possible to demodulate the entire reception signal after inputting only the beginning part of the reception signal to the equalization processing unit 507 a plurality of times, and adapting filter coefficients to the reception signal to be demodulated. By such an operation, it is possible to prevent a problem that due to the low estimation accuracy of the frame detection unit 505 and the timing estimation unit 508, the demodulation performance of the beginning part of the reception signal is reduced when the filter coefficients are reused. The equalization processing unit 507 inputs the reception signal after the equalization to the demapping unit 110, the frequency estimation unit 509, and the timing estimation unit 508.

The filter coefficient control unit 518 controls the filter coefficients of each of the linear filter unit 113 and the nonlinear filter unit 114. Specifically, upon detecting the reception signal first, the filter coefficient control unit 518 can read the filter coefficients used in the previous time slot from the control information storage unit 530, and can apply the read filter coefficients to the linear filter unit 113 and the nonlinear filter unit 114. However, as described above, when the nonlinear filter unit 114 is not used, the filter coefficient control unit 518 also can read and apply only the filter coefficients of the linear filter unit 113. The filter coefficient control unit 518 also has a function of storing the filter coefficients in the control information storage unit 530 in order to use, in the next time slot, the filter coefficients of the current time slot. The timing at which the filter coefficient control unit 518 stores the filter coefficients may be a periodic timing, for example, once per frame, or a timing requested from the control information storage unit 530.

In addition to the function of the timing estimation unit 108, the timing estimation unit 508 also has a function of performing a sliding correlation between an SOF sequence input from the frame detection unit 505 and a known sequence, and estimating a sampling timing of a reception signal in the current time slot. When the accuracy of estimating the sampling timing is insufficient, the timing estimation unit 508 can improve the resolution of an estimation value by up-sampling the reception signal or the known sequence. The timing estimation unit 508 inputs the timing information generated by such a function to the timing control unit 503.

The frequency estimation unit 509 performs a frequency estimation process of estimating frequency deviation on the basis of the reception signal input from the equalization processing unit 507, and inputs frequency information indicating an estimation value to the frequency control unit 504. The frequency estimation unit 509 has a function similar to that of the frequency estimation unit 109, but as described above, when there is no large frequency variation from the previous time slot, the above-described frequency estimation process can be omitted by using the past frequency information.

The functions of the demapping unit 110, the FEC unit 111, and the reference signal generation unit 112 are similar to those in the first embodiment.

Figure 9:
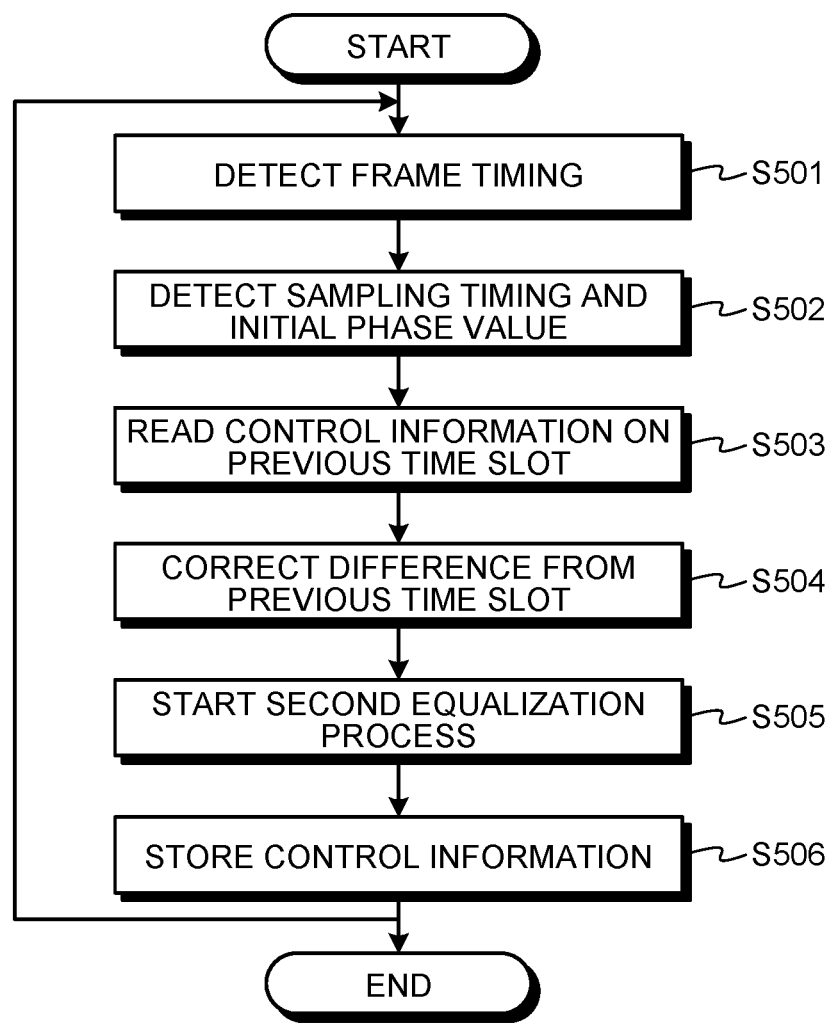
FIG. 9 is a flowchart illustrating an operation of the reception device illustrated in FIG. 7.

FIG. 9 is a flowchart illustrating an operation of the reception device 500 illustrated in FIG. 7. The frame detection unit 505 of the reception device 500 performs a frame timing detection process of detecting a part of a known signal (Step S501). The frame detection unit 505 extracts a reception signal corresponding to the known signal on the basis of the result of the detection, and inputs the reception signal to the timing estimation unit 508. In addition, the frame detection unit 505 calculates a phase of the reception signal from a correlation value when detecting a frame, detects the calculated phase as an initial phase value, and inputs the detected initial phase value to the phase control unit 510. The timing estimation unit 508 estimates a sampling timing using the input reception signal, and inputs timing information indicating a result of the estimation to the timing control unit 503 (Step S502).

The synchronization processing unit 520 reads control information on the previous time slot stored in the control information storage unit 530 (Step S503). Specifically, the timing control unit 503 reads timing information indicating a sampling timing of a past reception signal from the control information on the previous time slot stored in the control information storage unit 530. The frequency control unit 504 reads past frequency information from the control information on the previous time slot stored in the control information storage unit 530. The phase control unit 510 reads phase information from the control information on the previous time slot stored in the control information storage unit 530.

Subsequently, the synchronization processing unit 520 corrects a difference between the control information on the previous time slot and control information on the current time slot (Step S504). Specifically, the timing control unit 503 obtains a difference between the past sampling timing indicated by the read timing information and an estimation value input from the timing estimation unit 508, and corrects the difference by interpolating the reception signal or resampling the stored filter coefficients so that the filter coefficients can be reused. The frequency control unit 504 corrects the reception signal using the read frequency information. The phase control unit 510 obtains a difference between the read phase information and the phase information on the current reception signal input from the frame detection unit 505, and makes it possible to reuse the filter coefficients by controlling the phase of the current reception signal or applying phase rotation to the stored filter coefficients on the basis of the obtained difference.

When the sampling timing, an initial phase of the input reception signal, and a frequency control amount are obtained, the equalization processing unit 507 starts the second equalization process which is an adaptive equalization process of updating the filter coefficients of the linear filter unit 113 and the nonlinear filter unit 114 using the filter coefficients of the linear filter unit 113 and the filter coefficients of the nonlinear filter unit 114 used in the previous time slot (Step S505).

In addition, for example, in a period in which a known signal is received, a frame period, and the like, the synchronization processing unit 520 and the equalization processing unit 507 store the filter coefficients and the synchronization information as control information in the control information storage unit 530 (Step S506). The stored control information is used in a process in the next time slot. By repeating the operations in Steps S501 to S506 illustrated in FIG. 9, even when a burst signal such as that used in TDMA is received, a nonlinear equalization process can be performed without obtaining the filter coefficients again every time the signal is received. As described above, when an error in the filter coefficients is large, prior to Step S505, the beginning of the reception signal may be input to the equalization processing unit 507 to update the filter coefficients by LMS, thereafter, a step (not illustrated) of executing the equalization process may be executed again from the beginning to adapt the filter coefficients to the reception signal, and then Step S505 may be executed.

As described above, according to the third embodiment of the present invention, first, in a system such as TDMA in which a burst signal arrives, the reuse of filter coefficients previously used, for example, filter coefficients used in a previous time slot makes it possible to realize a nonlinear equalization process without re-estimating filter coefficients.

As described in the third embodiment, the method of reusing the past control information can be applied as long as the past control information is stored in the system in which a burst signal arrives. For example, as described in the first embodiment, when the second equalization process is started and the update of the filter coefficients is started after performing the synchronization process on the basis of the reception signal filtered in the first equalization process, the equalization processing unit 507 and the synchronization processing unit 520 may store the updated filter coefficients and the synchronization information. The filter coefficients and the synchronization information thus stored are reused when processing a reception signal which arrives thereafter.

Fourth Embodiment

Figure 10:
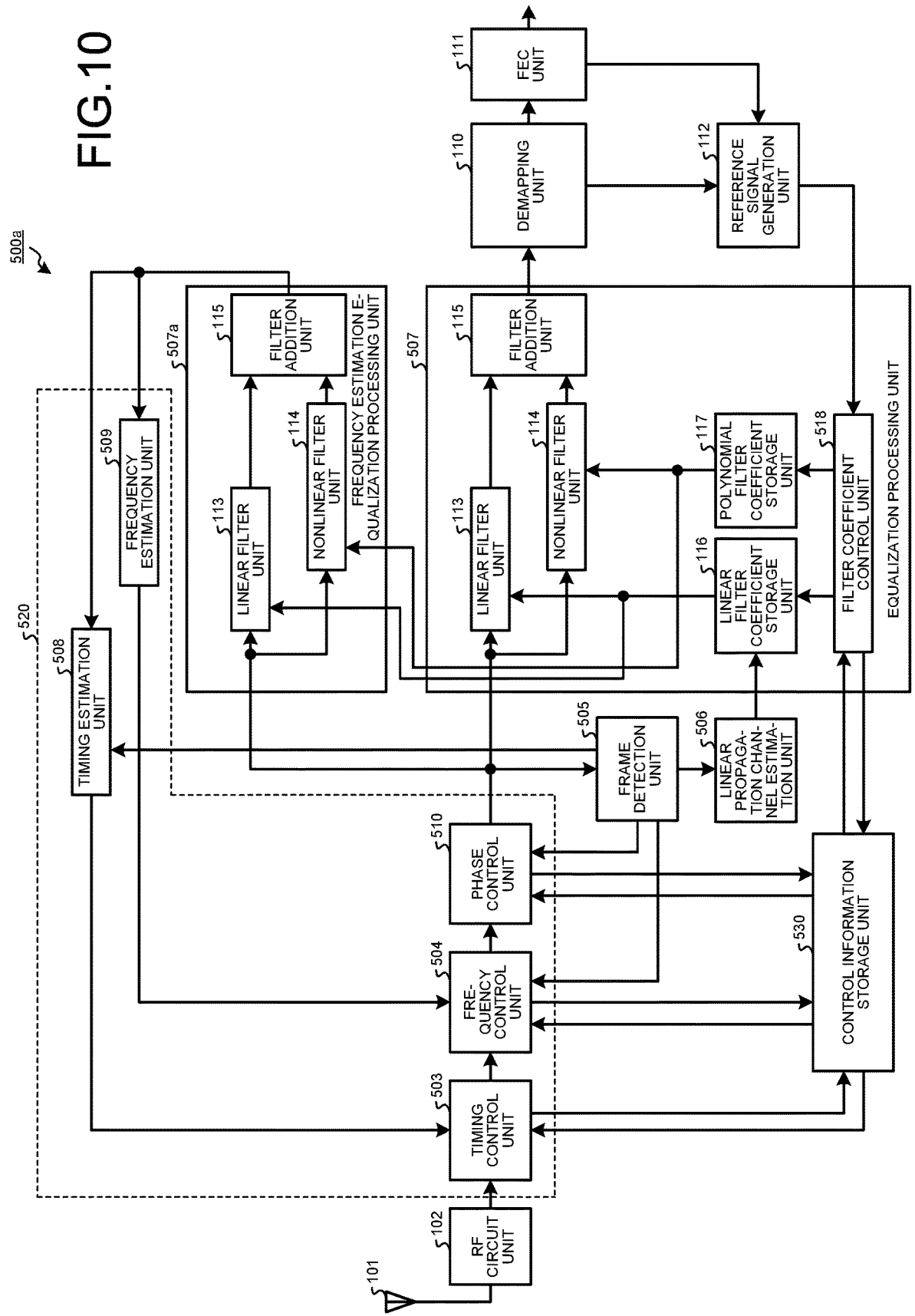
FIG. 10 is a diagram illustrating a functional configuration of a reception device according to a fourth embodiment of the present invention.

FIG. 10 is a block diagram illustrating a functional configuration of a reception device 500a according to a fourth embodiment of the present invention. As illustrated in FIG. 10, the reception device 500a includes, in addition to the configuration of the reception device 500 according to the third embodiment, a frequency estimation equalization processing unit 507a including the linear filter unit 113, the nonlinear filter unit 114, and the filter addition unit 115. In the functional configuration of the reception device 500a, parts similar to those of the reception device 500 are given the same reference numerals, and thereby descriptions thereof will be omitted. Hereinafter, differences from the reception device 500 will be mainly described.

The frequency estimation equalization processing unit 507a is provided in parallel with the equalization processing unit 507, and the linear filter unit 113 and the nonlinear filter unit 114 of the frequency estimation equalization processing unit 507a receives an input of a reception signal output by the phase control unit 510 of the synchronization processing unit 520. In addition, the frequency estimation equalization processing unit 507a captures filter coefficients used by the equalization processing unit 507. The frequency estimation equalization processing unit 507a applies the captured filter coefficients to the linear filter unit 113 and the nonlinear filter unit 114 of the frequency estimation equalization processing unit 507a, fixes the filter coefficients, and performs an equalization process on the reception signal input from the phase control unit 510 without executing update by LMS. The frequency estimation equalization processing unit 507a inputs the reception signal after the equalization process to the timing estimation unit 508 and the frequency estimation unit 509.

The configuration of the present embodiment is effective when demodulation is performed while correcting a sampling timing by LMS with respect to small clock deviation smaller than resolution controllable by the timing control unit 503. When following the clock deviation with LMS, it is necessary to increase an update step size of LMS, but on the other hand, frequency deviation which should be estimated by the frequency estimation unit 509 is also followed, and consequently, there may be a case where an estimation value obtained by the frequency estimation unit 509 is not a value originally intended to be estimated. Therefore, as described above, the frequency estimation equalization processing unit 507a and the equalization processing unit 507 for performing the equalization process while following the clock deviation and executing demodulation at a subsequent stage are separately operated in parallel, and thereby it is possible to realize a nonlinear equalization process which follows the clock deviation while obtaining high frequency estimation accuracy.

However, if the same filter coefficients are continuously used, an error in an equalization output signal increases due to the clock deviation, and a frequency estimation error increases. Therefore, it is preferable that the frequency estimation equalization processing unit 507a periodically capture the filter coefficients of the equalization processing unit 507. A period for the capturing may be a predetermined number of samples, or may be a period including the beginning of a frame or a known signal. Alternatively, timing determined by other methods can be used.

In FIG. 10, the equalization output signal input to the timing estimation unit 508 is a reception signal output by the frequency estimation equalization processing unit 507a, but when it is sufficient that the clock deviation is followed by LMS, the timing estimation using the equalization output signal may not be executed.

In the configuration of the reception device 500a, a circuit scale is increased by the frequency estimation equalization processing unit 507a, and a circuit scale required for an equalization process is approximately doubled. Therefore, when there are not enough resources, processes may be separated in time series, and the frequency equalization process and the equalization process may be alternately executed in a time-division manner. In that case, a time-division process can be realized using the configuration of the reception device 500 illustrated in FIG. 7. In FIG. 10, the same signal is input to the frequency estimation equalization processing unit 507a and the equalization processing unit 507, but a signal input to the frequency control unit 504 may be diverted and input to the frequency estimation equalization processing unit 507a. With this configuration, it is possible to avoid a control configuration of a feedback system in which a signal corrected on the basis of the frequency estimation result is input to the frequency estimation equalization processing unit 507a, and to realize a more stable operation. However, when this configuration is used, the filter coefficients captured from the equalization processing unit 507 are used as it is in the frequency estimation equalization processing unit 507a, so that a phase of an output signal of the frequency estimation equalization processing unit 507a is not known. However, when a frequency estimation process which does not require the absolute phase of the reception signal is performed in the frequency estimation unit 509, for example, when using a method of estimating a frequency from a relative phase rotation amount of a pilot signal periodically included in the reception signal or the like, a frequency estimation can be made without any problem even if the phase of the output signal of the frequency estimation equalization processing unit 507a is not known.

As described above, according to the reception device 500a of the fourth embodiment of the present invention, the frequency estimation equalization processing unit 507a is separated from the equalization processing unit 507 for demodulation which follows the clock deviation. Consequently, it is possible to maintain the frequency estimation accuracy while following the clock deviation, and as a result, it is possible to improve the demodulation performance of nonlinear equalization.

Figure 11:
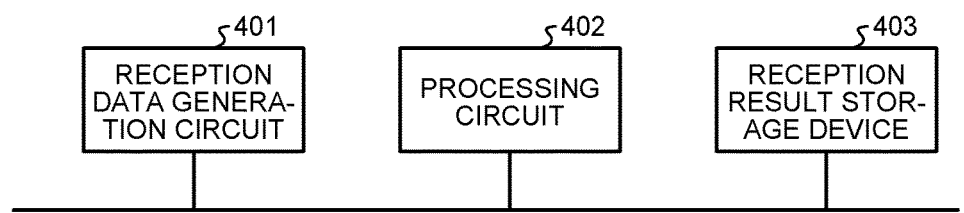
FIG. 11 is a diagram illustrating an example in which the reception devices illustrated in FIGS. 1, 7, and 10 are configured by using dedicated hardware.

FIG. 11 is a diagram illustrating an example in which the reception devices 100, 500, and 500a respectively illustrated in FIGS. 1, 7, and 10 are configured by using dedicated hardware. The functions of the reception devices 100, 500, and 500a can be realized by using a reception data generation circuit 401, a processing circuit 402, and a reception result storage device 403.

The reception data generation circuit 401 acquires a reception signal from the antenna. The processing circuit 402 performs a baseband process of compensating for distortion, or the like. The processing circuit 402 is, for example, a circuit such as a field programmable gate array (FPGA) and a large scale integration (LSI). It is possible to change which of the processes are executed by the reception data generation circuit 401 and which of the processes are executed by the processing circuit 402 as necessary. The reception result storage device 403 stores data demodulated by the processing circuit 402 as a reception result.

Figure 12:
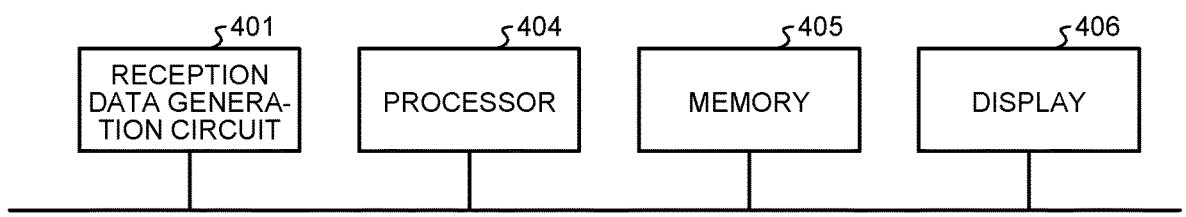
FIG. 12 is a diagram illustrating an example in which the reception devices illustrated in FIGS. 1, 7, and 10 are configured by using software.

FIG. 12 is a diagram illustrating an example in which the reception devices 100, 500, and 500a respectively illustrated in FIGS. 1, 7, and 10 are configured by using software. The functions of the reception devices 100, 500, and 500a can be realized by using the reception data generation circuit 401, a processor 404, a memory 405, and a display 406.

The processor 404 reads a computer program for performing distortion compensation from the memory 405 and executes the computer program, thereby realizing each of the functions of the reception devices 100, 500, and 500a. The processor 404 is a central processing unit (CPU), and also referred to as a central processing device, a processing device, an arithmetic device, a microprocessor, a microcomputer, a digital signal processor (DSP), or the like.

The memory 405 is, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disk (DVD). The memory 405 is also used as a temporary memory in each process executed by the processor 404, and a waveform, a filter coefficient, a set value, and the like, which are intermediate data during a process of the processor 404, are read and written.

The display 406 is a display device which displays a processing result. Although the reception devices 100, 500, and 500a include the display 406 here, devices other than the reception devices 100, 500, and 500a, which acquire the demodulation result and operate, may include the display 406.

The configurations described in the embodiments above are merely examples of the content of the present invention and can be combined with other known technology and part thereof can be omitted or modified without departing from the gist of the present invention.

For example, in a communication system which does not use an error correction code, the FEC unit 111 may be omitted in the reception devices 100, 500, and 500a. In an environment in which phase noise is large and thus is non-negligible, a phase compensation function may be provided in front of the frequency estimation unit 109 in the reception devices 100, 500, and 500a to add a process of correcting the amount of deviation from an observed reference phase for a filter output or a filter input while following variation in a phase offset of a reception signal. A waveform shaping filter having a fixed coefficient such as a roll-off filter may be provided after the RF circuit unit 102.

In addition, in a receiving method with the nonlinear distortion compensation described above, especially in a multivalued and high code rate transmission method which operates with driving power of an amplifier having large nonlinear distortion and at a high signal-noise ratio (SNR), a potent performance improvement effect can be obtained. On the other hand, in a low-multivalued method, an influence of white noise becomes dominant and thus the performance improvement effect is limited. In systems where a modulation scheme can be switched, such as DVB-S2 transmission, an addition process of a multivalue filter may be set such that it can be stopped based on the information indicating at least one of the modulation scheme information (MODCOD) and the code rates included in a frame. As a result, unnecessary nonlinear distortion compensation can be stopped even when a modulation scheme driven at a low SNR is used, and communication performance can be improved.

REFERENCE SIGNS LIST

11 header portion; 12 pilot portion; 13 data portion; 100, 500, 500a reception device; 101 receiving antenna; 102 RF circuit unit; 103, 503 timing control unit; 104, 504 frequency control unit; 105, 505 frame detection unit; 106, 106-1, 506 linear propagation channel estimation unit; 107, 507 equalization processing unit; 108, 508 timing estimation unit; 109, 509 frequency estimation unit; 110 demapping unit; 111 FEC unit; 112 reference signal generation unit; 113 linear filter unit; 114 nonlinear filter unit; 115 filter addition unit; 116 linear filter coefficient storage unit; 117 polynomial filter coefficient storage unit; 118, 518 filter coefficient control unit; 120, 520 synchronization processing unit; 201 known signal extraction unit; 202 known signal storage unit; 203 inverse matrix calculation unit; 204 filter coefficient calculation unit; 301 band-limiting filter information storage unit; 302 replica generation unit; 303 propagation channel calculation unit; 304 propagation channel inverse characteristic calculation unit; 305 interpolation unit; 401 reception data generation circuit; 402 processing circuit; 403 reception result storage device; 404 processor; 405 memory; 406 display; 507a frequency estimation equalization processing unit; 510 phase control unit; 530 control information storage unit; TS0, TS1, TS2 time slot.

The invention claimed is:

1. A reception device comprising:
    an equalization processor to perform an equalization process on a reception signal, the equalization processor including a linear filter and a nonlinear filter;
    a linear propagation channel estimator to make a propagation channel estimation using a known signal included in a reception signal to calculate a filter coefficient of the linear filter; and
    a synchronization processor to perform a synchronization process of correcting frequency deviation on a basis of a signal output by the equalization processor, wherein when a predetermined condition is satisfied after executing a first equalization process of outputting a reception signal filtered by the linear filter to the synchronization processor, the equalization processor starts a second equalization process that is an adaptive equalization process of outputting a result of addition of a reception signal filtered by the linear filter and a reception signal filtered by the nonlinear filter to the synchronization processor.

2. The reception device according to claim 1, wherein the synchronization processor includes a timing controller to compensate for a timing phase on a basis of a result of an estimation of a symbol timing phase, and a frequency controller to perform frequency correction using a signal whose timing phase is compensated for.

3. The reception device according to claim 1, wherein the equalization processor includes a filter coefficient controller to control a filter coefficient of the linear filter and a filter coefficient of the nonlinear filter, and in the second equalization process, the filter coefficient controller starts updating the filter coefficient of the linear filter and then starts updating the filter coefficient of the nonlinear filter.

4. The reception device according to claim 3, wherein the synchronization processor includes a frequency estimator to perform a first frequency estimation process of estimating the frequency deviation in a state where the linear filter uses an initial value of a filter coefficient, and, after update of the filter coefficient of the linear filter is started and before update of the filter coefficient of the nonlinear filter is started, perform a second frequency estimation process of estimating the frequency deviation.

5. The reception device according to claim 1, wherein the nonlinear filter is a polynomial filter using a memory polynomial.

6. The reception device according to claim 1, wherein whether to use the nonlinear filter is switched on a basis of information indicating at least one of a modulation scheme and a code rate included in the reception signal.

7. The reception device according to claim 1, wherein the linear propagation channel estimator makes the propagation channel estimation using shape information on a band-limiting filter on a transmission side.

8. The reception device according to claim 7, wherein the linear propagation channel estimator generates an oversampled known signal sequence, and on a basis of the known signal sequence, estimates a propagation channel component excluding an influence of the band-limiting filter.

9. The reception device according to claim 8, wherein the linear propagation channel estimator generates a plurality of the known signal sequences generated with different timing offsets, and estimates a propagation channel component excluding an influence of the band-limiting filter on a basis of each of the plurality of the known signal sequences.

10. The reception device according to claim 1, wherein the predetermined condition is based on at least one of time elapsed since the synchronization process is started, the number of processed samples after start of the synchronization process, and a signal quality after an equalization process.

11. The reception device according to claim 1, wherein the reception signal is a burst signal that is nonconsecutive in time, the reception device further comprises a control information storage to store synchronization information indicating a synchronization state of a reception signal input to the equalization processor and filter coefficients of the equalization processor, the synchronization processor performs the synchronization process on a current reception signal using the synchronization information stored when processing a past reception signal, and the equalization processor performs the second equalization process on the current reception signal using the filter coefficients stored when processing the past reception signal.

12. The reception device according to claim 11, wherein the synchronization information includes phase information on a reception signal input to the equalization processor, and the reception device further comprises a phase controller having a function of controlling a phase of a current reception signal on a basis of a difference between phase information on a past reception signal stored in the control information storage and phase information on the current reception signal.

13. The reception device according to claim 11, wherein the synchronization information includes timing information indicating a symbol timing of a reception signal input to the equalization processor, and the reception device further comprises:

a timing estimator to estimate a symbol timing shift and to generate timing information indicating an estimation result; and a timing controller to change a sampling timing of a current reception signal on a basis of a difference between timing information on a past reception signal stored in the control information storage and timing information on the current reception signal output by the timing estimator.

14. The reception device according to claim 1, further comprising:

a frequency estimation equalization processor to capture a filter coefficient of the linear filter of the equalization processor and a filter coefficient of the nonlinear filter of the equalization processor, and to output a signal for frequency equalization that is filtered in a state where the filter coefficients are fixed using the captured filter coefficients.

15. A reception device that receives a burst signal that arrives nonconsecutively in time, the device comprising:

an equalization processor to perform an equalization process on a reception signal, the equalization processor including a linear filter and a nonlinear filter;

a synchronization processor to perform a synchronization process of correcting an input reception signal; and a control information storage to store synchronization information indicating a synchronization state of a reception signal input to the equalization processor, and filter coefficients of the equalization processor, wherein the synchronization processor performs the synchronization process on a current reception signal using the synchronization information stored in the control information storage when processing a past reception signal, and the equalization processor performs an adaptive equalization process of outputting, to the synchronization processor, a result of addition of a reception signal filtered by the linear filter and a reception signal filtered by the nonlinear filter using the filter coefficients stored in the control information storage when processing the past reception signal.

16. The reception device according to claim 15, wherein the synchronization information includes timing information indicating a sampling timing of a reception signal input to the equalization processor, phase information on the reception signal, and frequency information on the reception signal, and the filter coefficients include a filter coefficient of the linear filter and a filter coefficient of the nonlinear filter.

17. A reception signal processing method, wherein
a reception device that receives a reception signal executes:
calculating a filter coefficient of a linear filter by making a propagation channel estimation using a known signal included in the reception signal;
performing a synchronization process of correcting frequency deviation on a basis of a reception signal filtered by the linear filter in a first equalization process using the calculated filter coefficient;
starting a second equalization process of outputting a result of addition of the reception signal filtered by the linear filter and a reception signal filtered by a nonlinear filter as a result of an equalization process when a predetermined condition is satisfied; and
updating filter coefficients of the linear filter and the nonlinear filter using an adaptive algorithm.

18. The reception signal processing method according to claim 17, wherein
after executing the updating,
a reception device that receives a burst signal that is nonconsecutive in time repeatedly executes:
storing, in a control information storage, synchronization information indicating a synchronization state of a signal input to an equalization processor including the linear filter and the nonlinear filter, and filter coefficients of the equalization processor;
estimating a sampling timing and a phase of a reception signal when the reception signal is input;
reading previously estimated timing phase information and phase information stored in the control information storage unit, and making a comparison with an estimation value of a current reception signal;
correcting a reception signal on a basis of a comparison result; and
performing an equalization process on the reception signal after correction using past filter coefficients stored in the control information storage, and updating filter coefficients of the linear filter and the nonlinear filter using an adaptive algorithm.

19. A reception signal processing method, wherein
a reception device that receives a burst signal that is nonconsecutive in time repeatedly executes:
estimating a sampling timing and a phase of a reception signal using a known signal included in the reception signal;
reading information indicating a sampling timing and a phase previously estimated and stored in a control information storage, and making a comparison with estimation results of a sampling timing and a phase of a current reception signal;
correcting a reception signal on a basis of comparison results;
performing an equalization process on the reception signal that is corrected, by using past filter coefficients stored in the control information storage, and updating a filter coefficient of each of a linear filter and a nonlinear filter using an adaptive algorithm; and
storing, in the control information storage, timing phase information indicating the sampling timing and phase information indicating the phase estimated in the estimating, frequency information on the reception signal, and the filter coefficients.

20. A control circuit for controlling a reception device that receives a reception signal, the control circuit causing the reception device to execute:
calculating a filter coefficient of a linear filter by making a propagation channel estimation using a known signal included in the reception signal;
performing a synchronization process of correcting frequency deviation on a basis of a reception signal filtered by the linear filter in a first equalization process using the calculated filter coefficient;
starting a second equalization process of outputting a result of addition of the reception signal filtered by the linear filter and a reception signal filtered by a nonlinear filter as a result of an equalization process when a predetermined condition is satisfied; and
updating filter coefficients of the linear filter and the nonlinear filter using an adaptive algorithm.

21. A control circuit for controlling a reception device that receives a burst signal that is nonconsecutive in time, the control circuit causing the reception device to repeatedly execute:
estimating a sampling timing and a phase of a reception signal using a known signal included in the reception signal;
reading information indicating a sampling timing and a phase previously estimated and stored in a control information storage, and making a comparison with estimation results of a sampling timing and a phase of a current reception signal;
correcting a reception signal on a basis of comparison results;
performing an equalization process on the reception signal that is corrected, by using past filter coefficients stored in the control information storage, and updating a filter coefficient of each of a linear filter and a nonlinear filter using an adaptive algorithm; and
storing, in the control information storage, timing phase information indicating the sampling timing and phase information indicating the phase estimated in the estimating, frequency information on the reception signal, and the filter coefficients.

22. A non-transitory recording medium storing therein a program for controlling a reception device that receives a reception signal, the program causing the reception device to execute:
calculating a filter coefficient of a linear filter by making a propagation channel estimation using a known signal included in the reception signal;
performing a synchronization process of correcting frequency deviation on a basis of a reception signal filtered by the linear filter in a first equalization process using the calculated filter coefficient;
starting a second equalization process of outputting a result of addition of the reception signal filtered by the linear filter and a reception signal filtered by a nonlinear filter as a result of an equalization process when a predetermined condition is satisfied; and
updating filter coefficients of the linear filter and the nonlinear filter using an adaptive algorithm.

23. A non-transitory recording medium storing therein a program for controlling a reception device that receives a burst signal that is nonconsecutive in time, the program causing the reception device to repeatedly execute:

estimating a sampling timing and a phase of a reception signal using a known signal included in the reception signal;

reading information indicating a sampling timing and a phase previously estimated and stored in a control information storage, and making a comparison with estimation results of a sampling timing and a phase of a current reception signal;

correcting a reception signal on a basis of comparison results;

performing an equalization process on the reception signal that is corrected, by using past filter coefficients stored in the control information storage, and updating a filter coefficient of each of a linear filter and a nonlinear filter using an adaptive algorithm; and storing, in the control information storage, timing phase information indicating the sampling timing and phase information indicating the phase estimated in the estimating, frequency information on the reception signal, and the filter coefficients.

* * * * *